United States Patent [19]

Shim

[11] Patent Number: 5,746,057
[45] Date of Patent: May 5, 1998

[54] ELECTRONIC CONTROL TYPE BRAKE BOOSTER FOR VEHICLE

[75] Inventor: Tae-Young Shim, Seoul, Rep. of Korea

[73] Assignee: Mando Machinery Corporation, Kyungki-Do, Rep. of Korea

[21] Appl. No.: 753,520

[22] Filed: Nov. 26, 1996

[30] Foreign Application Priority Data

Nov. 28, 1995 [KR] Rep. of Korea ............... 44212

[51] Int. Cl.⁶ .................................................. F15B 7/00
[52] U.S. Cl. ..................... 60/545; 60/547.1; 91/367; 91/376 R
[58] Field of Search ................. 60/545, 547.1, 60/552; 91/367, 376 R

[56] References Cited

U.S. PATENT DOCUMENTS

| | | | |
|---|---|---|---|
| 3,481,654 | 12/1969 | Grancon | 60/545 |
| 3,800,666 | 4/1974 | Kasselmann | 91/376 R |
| 4,494,377 | 1/1985 | Sato | 60/547.1 |
| 4,610,483 | 9/1986 | Matsumoto et al. | 60/545 |
| 5,312,173 | 5/1994 | Rossigno | 60/545 |
| 5,437,217 | 8/1995 | Castel et al. | 91/376 R |

FOREIGN PATENT DOCUMENTS 197454  10/1985  Japan ........................ 91/376 R

*Primary Examiner*—F. Daniel Lopez
*Attorney, Agent, or Firm*—John P. White

[57] ABSTRACT

An electronic control type brake booster having a brake booster; an air path separately formed from a path to which an engine vacuum pressure of said brake booster is applied; a pressure control valve arranged in the air path and driven by a solenoid valve, said pressure control valve providing a pilot pressure to the air path of said brake booster to control the pressure in the air path to a pressure between atmospheric pressure and the engine vacuum pressure; a wrinkled bellows tube connected to a predetermined portion of said air path connected to the pressure control valve; an operational chamber inwardly formed of a movable wall communicated with the bellows tube; a plunger located at an inside portion of the movable wall and formed with an operational chamber and a further chamber according to an operation of the plunger; an annular element arranged between the plunger and the movable wall; and a hole formed at the upper portion of the annular element and communicating with the further chamber.

1 Claim, 3 Drawing Sheets

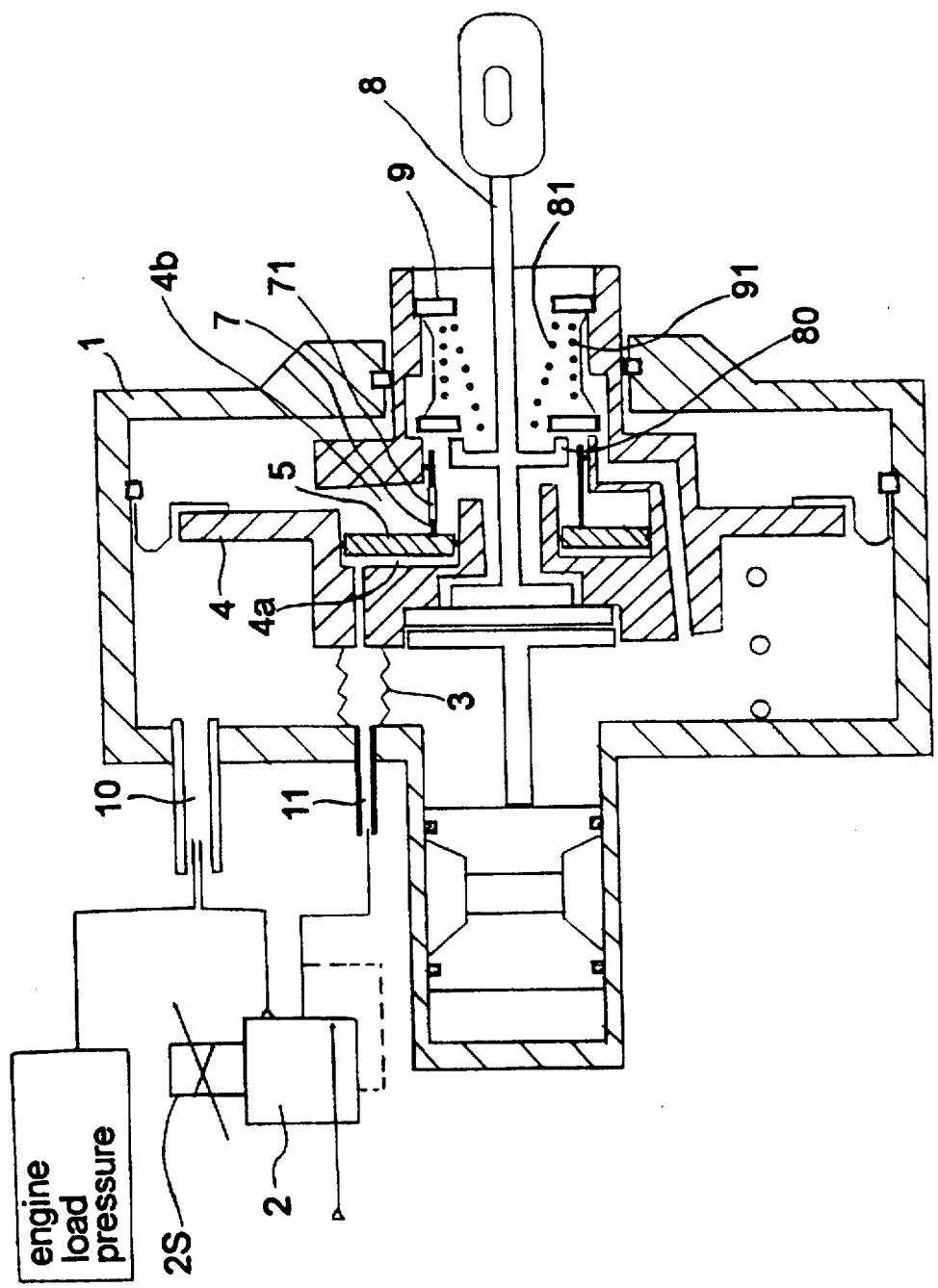

ELECTRONIC CONTROL TYPE BRAKE BOOSTER FOR VEHICLE

BACKGROUND OF THE INVENTION

1. Field of the Invention

The present invention relates to an electronic control type brake booster, and in particular to an improved electronic control type brake booster which is capable of generating a linear braking pressure which is proportional to an external pilot pressure by installing a valve operable in accordance with the linear braking pressure in a booster valve housing, whereby a braking operation is automatically performed in accordance with a control signal without using a driver's brake pedal.

2. Description of the Conventional Art

Lucas Co. disclosed a technique for generating a predetermined linear braking force in accordance with an externally applied control signal (for example, a voltage) by using a conventional brake booster.

FIG. 1 is a cross-sectional view illustrating the construction of a conventional brake booster, and FIG. 2 is a cross-sectional view illustrating a conventional electronic control type brake booster made by the Lucas Co.

As shown therein, a tube 300 made of a wrinkled rubber is arranged in an air path 200 in a front portion 100a and a rear portion 100b of a booster housing 100, and is communicated with a path 400. In addition, as shown in FIG. 2, a proportional solenoid 500, a valve plunger 501, and a valve 502 are arranged in the path 400.

When an electrical signal is not applied to the solenoid, the conventional brake booster works as a common booster.

Namely, when a driver presses a brake pedal "P", a rubber valve 601 forwardly advances together with a rod 600, for thus sealing an air path 610. When the rod 600 further advances, the rubber valve 601 loses contact with a valve seat 620. Air is introduced into the rear portion 100b of the booster through a gap formed between the valve seat 620 and the rubber valve 601. Here, since an engine vacuum is always applied to the front portion 100a of the booster, a predetermined braking pressure is generated in a master cylinder 700 in cooperation with a pressure difference between the front portion 100a and the rear portion 100b.

On the contrary, when the pedal "P" is rearwardly moved by the driver, the valve seat 620 of the rod 600 comes into contact with the rubber valve 601, for thus blocking a flow of air. When the rod 600 is further rearwardly moved, the air path 610 is opened, and the air from the rear portion 100b is introduced to the front portion 100a through the air path 610, whereby an air pressure in the front and rear portions 100a and 100b is made identical, so that a linear brake pressure in the master cylinder 700 is removed.

As described above, during the brake pedal operation, the operation thereof is performed in the same manner as the operation of the conventional brake booster.

Meanwhile, in a state that the driver does not press the pedal, when it is necessary to apply a braking force, a voltage is supplied to the solenoid 500 in accordance with an externally applied control signal, and the valve plunger 501 comes into contact with the valve 502, for thus blocking the path 400. As a result, the communication between the front and rear portions 100a and 100b through the path 610 is blocked.

When the plunger 501 is continuously moved, the path 510 communicating with the outside is opened, and the air is introduced to the rear portion of the booster through the paths 510, 400, and 610, so that there is formed a pressure difference between the front and rear portions 100a and 100b. Therefore, a braking pressure is generated in the master cylinder 700, for performing a braking operation.

FIG. 3 is a cross-sectional view illustrating a valve housing of another conventional electronic control type brake booster introduced by LUCAS company in which a solenoid valve is integral with the valve housing. As shown therein, a solenoid 800, a plunger 801, a valve 802, a rubber valve 803, a front-rear portion path 804, and an air-rear portion path 805 are arranged in a housing 100 of the booster.

When a voltage is supplied to the solenoid 800, the plunger 801 is moved for separating the valve 802 from the rubber valve 803, and air in the rear side of the housing of the booster valve is introduced to the rear portion of the booster through the air-rear portion path 805.

When the voltage is not supplied to the solenoid 800, the plunger 801 is rearwardly moved in cooperation with an elastic force of a spring 806, for thus blocking the path, and when the plunger is further rearwardly moved, the rubber valve 803 and the valve 802 are separated. An air in the rear side of the booster is moved to the front portion through the front-rear path 804 and the air-rear portion path 805, so that the pressure in the front and rear portions is made identical, and thus the pressure in the master cylinder is removed, and the braking operation is stopped thereby.

As described above, the conventional electronic control type brake booster disadvantageously has a path which becomes a wrinkled rubber tube, and an additional solenoid valve is required, for thus increasing the fabrication cost, and the fabrication processes are complicated.

In addition, so as to integrate the solenoid valve and the valve housing as shown in FIG. 3, a bigger product must be disadvantageously made.

Furthermore, so as to obtain a desired braking pressure, it is necessary to control the positions of an additional sensor and valve plunger, thereby causing a complicated structure of the system due to an additionally provided circuit system.

SUMMARY OF THE INVENTION

Accordingly, it is an object of the present invention to provide an electronic control type brake booster which overcomes the problems encountered in the conventional electronic control type brake booster.

It is another object of the present invention to provide an improved electronic control type brake booster which is capable of changing the construction of a solenoid to an operation chamber and operable plunger type and obtaining a desired linear brake pressure in a master cylinder by using a pressure difference in front and rear portions of a booster, which pressure difference is proportional to a pilot pressure.

To achieve the above objects, there is provided an improved electronic control type brake booster which includes a member for obtaining a linear brake pressure in a master cylinder by using a front and rear portion pressure difference of a booster, which pressure difference is proportional to a pilot pressure in a booster valve housing.

To achieve the above objects, there is provided an improved electronic control type brake booster which further includes an air path separately formed from a path to which an engine vacuum pressure of an electronic control type brake booster, which is directed to obtaining a linear brake pressure proportional to an external pilot pressure, is applied; a pressure control valve arranged in the air path and driven by a solenoid; a wrinkled bellows tube connected to a portion of the air path to which the pressure control valve is connected; an operational chamber of a movable wall communicating with the bellows tube; an operational plunger arranged inside the circular diaphragm; an operational chamber and a further chamber defined by dividing the inside of the diaphragm by using the operational plunger; an annular element arranged between the operational plunger and the movable wall; and a hole formed in the upper portion of the annular element and communicating with a further chamber.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIG. 4 is a cross-sectional view illustrating an electronic control type brake booster according to the present invention.

DETAILED DESCRIPTION OF THE INVENTION

Figure 1:
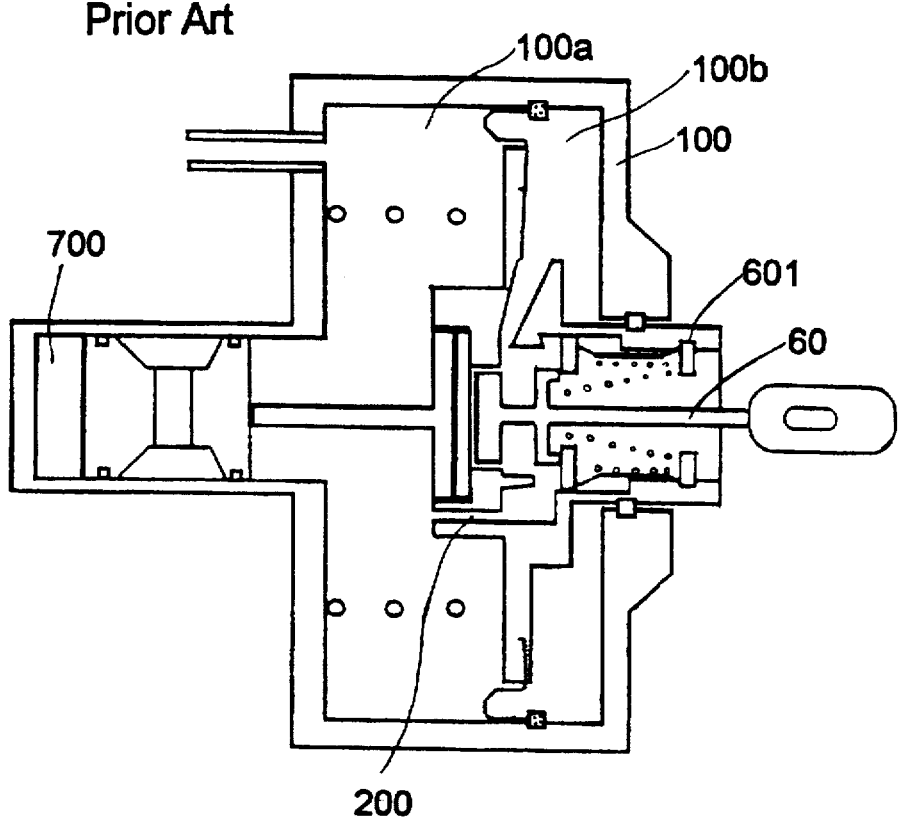
FIG. 1 is a cross-sectional view illustrating the construction of a conventional brake booster.
Figure 2:
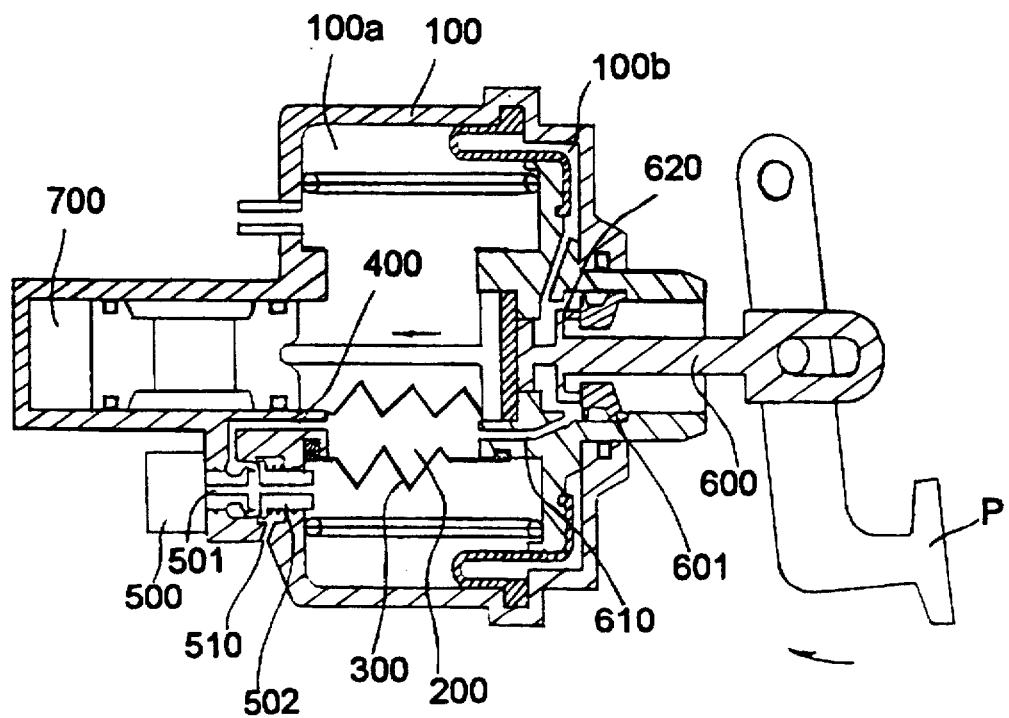
FIG. 2 is a cross-sectional view illustrating a conventional electronic control type brake booster.
Figure 3:
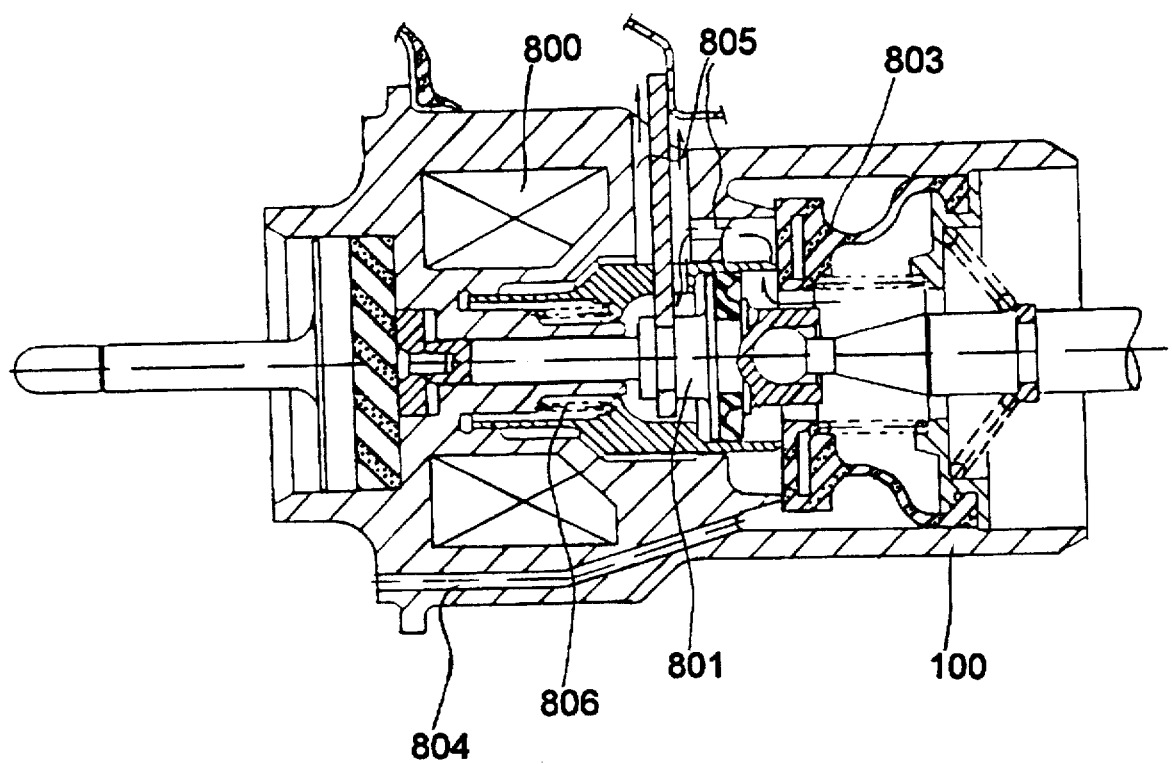
FIG. 3 is a cross-sectional view illustrating a valve housing of a conventional electronic control type brake booster in which a solenoid valve is integral with the valve housing.

FIG. 4 is a cross-sectional view illustrating an electronic control type brake booster according to the present invention.

As shown therein, an air path 11 is formed in an electronic control type brake booster separately from a path 10 in which a predetermined vacuum of an engine is applied. In addition, a pressure control valve 2 driven by a solenoid 2s is arranged in the air path 11.

A wrinkled bellows tube 3 is connected to another portion of the air path 11 to which the pressure control valve 2 is connected, and an operational chamber 4a is communicated with a movable wall 4 through the bellows tube 3.

The operational chamber 4a of the movable wall 4 fixed to the valve plunger 8 is formed in a donut shape.

An operable plunger 5 is arranged inside the movable wall 4, and the inside of the movable wall 4 is divided into the operational chamber 4a and a further chamber 4b by the operable plunger 5.

An annular element 7 is arranged between the operable plunger 5 and the movable wall 4, and a hole 71 communicating with the chamber 4b is formed in the upper portion of the annular element 7.

In the drawing, reference numeral 9 denotes a rubber valve, 80 denotes a valve seat in which the rubber valve 9 contacts with the valve plunger 8, and reference numerals 81 and 91 denote springs for elastically supporting the rubber valve to have an elastic force.

The electronic control type brake booster according to the present invention is basically directed to changing the conventional solenoid system to the operational chamber and the operable plunger according to the present invention, for thus more easily controlling the braking pressure by controlling the pressure in the operational chamber.

Therefore, since the operation of the booster in the normal mode is the same as in a usual operation, a description thereof is omitted. So, the operation of an automatic braking will now be explained with reference to FIG. 4.

The pressure control valve 2 serves to control the pressure between atmospheric pressure and an engine vacuum pressure and provides a pilot pressure to the air path 11 of the booster 1. In more detail, the pressure control valve 2 generates the pilot pressure ranging from the engine vacuum pressure and atmospheric pressure in accordance with the level of a current applied to a proportional solenoid 2s.

This pilot pressure is applied to the operational chamber 4a of the movable wall 4 through the bellows tube 3, and backwardly pushes the operational plunger 5, so that the annular element 7 fixed to the operational plunger 5 contacts with the rubber valve 9, for thus blocking front and rear paths of the movable wall 4.

When the operational plunger 5 is further rearwardly moved by the pilot pressure, the annular element 7 separates the rubber valve 9 from the valve seat 80 of the valve plunger 8 and defines a predetermined space therebetween. Atmospheric pressure is applied to the rear portion of the booster through the thusly defined space between the valve seat 80 of the valve plunger 8 and the rubber valve 9. A part of air introduced together with the atmospheric pressure is gathered in the rear side of the operational plunger 5, opposite the portion to which the pilot pressure is applied.

The pressure of the air introduced to the rear portion of the booster is increased, and applies a pressure to the rear side of the operational plunger 5. This pressure is made identical with the pressure in the operational chamber 4a, and the operational plunger 5 and the annular element 7 are rearwardly moved, for thus defining a position where the pressure in the rear side of the operational plunger 5 and the pressure in the operational chamber 4a are identical. In more detail, the pressure balance is obtained at a position where the air pressure in the rear side of the operational plunger 5 is related to the pilot pressure generated by the pressure control valve 2.

When the pilot pressure in the operational chamber 4a is decreased, since the pressure in the rear side of the booster is higher, the operational plunger 5 and the annular element 7 are moved toward the operational chamber 4a in cooperation with the pressure. As the annular element 7 is rearwardly moved and is separated from the rubber valve 9, the rubber valve 9 which was moved together with the annular element 7 comes into contact with the valve seat 80 of the valve plunger 8 in cooperation with an elastic force of the spring 91, for thus blocking the space between the valve seat 80 and the rubber valve 9, so that atmospheric pressure is not applied to the rear side of the booster.

The air in the rear side of the booster is escaped to the front side of the booster through the space defined between the rubber valve 9 and the annular element 7, which space is defined when the annular element 7 is rearwardly moved, so that the linear brake pressure in the master cylinder is removed.

As described above, the electronic control type brake booster is directed to obtaining a front and rear portion pressure difference which is proportional to the pilot pressure generated by the pressure control valve and a linear brake pressure in the master cylinder which is proportional to the front and rear portion pressure difference of the booster, for thus obtaining an easier linear brake pressure control.

In addition, the present invention is well adaptable to the system which requires an automatic braking operation. Furthermore, the present invention is directed to enable a more compact construction of the system, for thus reducing the fabrication cost.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An electronic control type brake booster for a vehicle comprising:

a brake booster;

an air path separately formed from a path to which an engine vacuum pressure of said brake booster is applied;

a pressure control valve arranged in the air path and driven by a solenoid, said pressure control valve providing a pilot pressure to the air path of said brake booster to control the pressure in the air path to a pressure between atmospheric pressure and the engine vacuum pressure;

a wrinkled bellows tube connected to a predetermined portion of said air path connected to the pressure control valve;

an operational chamber inwardly formed of a movable wall communicated with the bellows tube;

a plunger located at an inside portion of the movable wall and formed with an operational chamber and a further chamber according to an operation of the plunger;

an annular element arranged between the plunger and the movable wall; and a hole formed at the upper portion of the annular element and communicating with the further chamber.

* * * * *